US010255916B1

(12) United States Patent
Zetterberg

(10) Patent No.: US 10,255,916 B1
(45) Date of Patent: *Apr. 9, 2019

(54) METHODS, SYSTEMS, AND MEDIA FOR PRESENTING INTERACTIVE AUDIO CONTENT

(71) Applicant: Peter Zetterberg, Kirkland, WA (US)

(72) Inventor: Peter Zetterberg, Kirkland, WA (US)

(73) Assignee: PBJ Synthetics Corporation, Wilmington, DE (US)

( * ) Notice: Subject to any disclaimer, the term of this patent is extended or adjusted under 35 U.S.C. 154(b) by 56 days.

This patent is subject to a terminal disclaimer.

(21) Appl. No.: 15/443,511

(22) Filed: Feb. 27, 2017

Related U.S. Application Data

(63) Continuation of application No. 14/486,684, filed on Sep. 15, 2014, now Pat. No. 9,583,106.

(60) Provisional application No. 61/877,286, filed on Sep. 13, 2013.

(51) Int. Cl.
*G10L 15/00* (2013.01)
*G10L 15/22* (2006.01)
*G10L 15/26* (2006.01)
*G10L 13/08* (2013.01)

(52) U.S. Cl.
CPC ............ *G10L 15/22* (2013.01); *G10L 13/08* (2013.01); *G10L 15/265* (2013.01); *G10L 2015/223* (2013.01)

(58) Field of Classification Search
CPC ....... G10L 13/00; G10L 13/043; G10L 15/22; G10L 15/26; G10L 15/265; G06F 3/16; G09B 19/04; G06T 13/205

USPC .......... 704/260, 270, 275; 434/156
See application file for complete search history.

(56) References Cited

U.S. PATENT DOCUMENTS

| | | | | |
|---|---|---|---|---|
| 7,881,934 | B2* | 2/2011 | Endo | G10L 15/22 704/251 |
| 8,190,474 | B2* | 5/2012 | Lerman | G06Q 30/00 705/14.41 |
| 8,209,181 | B2* | 6/2012 | Heckerman | G09B 19/00 379/88.02 |

(Continued)

*Primary Examiner* — Paras D Shah
(74) *Attorney, Agent, or Firm* — Byrne Poh LLP

(57) ABSTRACT

Methods, systems, and media for presenting interactive audio content are provided. In some embodiments, the method includes: receiving narrative content that includes action points, wherein each of the action points provides user actions and a narrative portion corresponding to each of the user actions; determining a user engagement density associated with the narrative content, wherein the user engagement density modifies the number of the action points to provide within the narrative content; causing the narrative content to be presented to a user based on the user engagement density; determining that a speech input has been received at one of the action points in the narrative content; converting the speech input to a text input; determining whether the user action associated with the text input corresponds to one of the user actions; selecting the narrative portion corresponding to the text input in response to determining that the user action corresponds to one of the user actions; converting the selected narrative portion to an audio output; and causing the narrative content with the converted audio output of the selected narrative portion to be presented to the user.

19 Claims, 11 Drawing Sheets

(56) References Cited

U.S. PATENT DOCUMENTS

| | | | | |
|---|---|---|---|---|
| 8,533,604 | B1* | 9/2013 | Parenti | G06F 9/4443 715/707 |
| 2002/0072910 | A1* | 6/2002 | Kernble | G10L 15/22 704/270 |
| 2002/0182573 | A1* | 12/2002 | Watson | G09B 19/00 434/236 |
| 2004/0015360 | A1* | 1/2004 | Calabrese | G09B 5/065 704/270 |
| 2005/0221268 | A1* | 10/2005 | Chaar | G09B 7/02 434/350 |
| 2006/0194181 | A1* | 8/2006 | Rosenberg | G09B 5/06 434/317 |
| 2007/0213981 | A1* | 9/2007 | Meyerhoff | G10L 17/26 704/243 |
| 2009/0035733 | A1* | 2/2009 | Meitar | G09B 7/00 434/118 |
| 2009/0083631 | A1* | 3/2009 | Sidi | G06Q 30/02 715/721 |
| 2010/0037187 | A1* | 2/2010 | Kondziela | G06F 3/011 715/866 |
| 2010/0318362 | A1* | 12/2010 | Kurzweil | G10L 13/00 704/260 |
| 2012/0077160 | A1* | 3/2012 | Degutis | G09B 7/02 434/236 |
| 2012/0240081 | A1* | 9/2012 | Sim | G06Q 10/10 715/811 |
| 2012/0240085 | A1* | 9/2012 | Sim | G09B 5/14 715/864 |
| 2013/0311190 | A1* | 11/2013 | Reiner | G10L 25/48 704/270 |
| 2014/0136187 | A1* | 5/2014 | Wolverton | G06F 17/30654 704/9 |
| 2014/0195222 | A1* | 7/2014 | Peevers | G10L 21/003 704/201 |
| 2014/0343947 | A1* | 11/2014 | Winter | G10L 15/22 704/270.1 |
| 2016/0070678 | A1* | 3/2016 | Kidron | G09B 5/06 715/730 |

* cited by examiner

| DENSITY | MIN | MED | MAX |
|---|---|---|---|
| Main story thread | X | X | X |
| Detailed descriptions of situation & location | | X | X |
| Conditional narrative branching based on user input | | X | X |
| Detailed description of items & objects based on user input | | X | X |
| User dialogue with in-story characters | | | X |
| Interaction with items & objects | | | X |
| Solving of puzzles required to progress narrative | | | X |

FIG. 3

| Command | Action |
|---|---|
| "Start" | Starts or resume the narrative |
| "Pause" | Pauses the narrative |
| "Quit" | Exit the narrative and return to main menu |
| "Resume" | Continues the narrative after pause |
| "Save" | Saves the current player progression and narrative |
| "Load" | Loads the most recent player progression and narrative |
| "Recap" | The narrative provides with an update on current narrative and recent events |
| "Settings" | Allows the user to make changes to various settings relating to speech synthesizer, volume for sounds effects and other preferences (TBD) |

| Key word | Carefully | moment | creaking | something | Darkness |
|---|---|---|---|---|---|
| Base ambient sound | Heavy rain hitting metal roof, distant thunder and howling winds | | | | |
| Additive ambient sound | Dripping water from leaking pipes onto wooden floor and furniture | | | | |
| Narrative triggered effect | Impact sound representing the hit to the user's head | | | | |

FIG. 9

METHODS, SYSTEMS, AND MEDIA FOR PRESENTING INTERACTIVE AUDIO CONTENT

CROSS-REFERENCE TO RELATED APPLICATIONS

This application is a continuation of U.S. patent application Ser. No. 14/486,684, filed Sep. 15, 2014, which claims the benefit of U.S. Provisional Patent Application No. 61/877,286, filed Sep. 13, 2013, each of which is hereby incorporated by reference herein in its entirety.

TECHNICAL FIELD

The disclosed subject matter relates to methods, systems, and media for presenting interactive audio content.

BACKGROUND

With the cost of handheld electronic devices decreasing and the increasing demand for digital content, creative works that have once been published on printed media are becoming available as digital media. For example, audio books are increasingly popular among commuters. More particularly, for some written works, especially those that become popular, an audio version of the written work is created, where a recording of a narrator (e.g., often a famous individual) reading the written work is created and made available for purchase.

However, while audio books may be preferable for particular activities that the user is engaged in, audio books lack interactivity. Moreover, the listener cannot participate in the story.

Accordingly, it is desirable to provide methods, systems, and media for presenting interactive audio content.

SUMMARY

In accordance with some embodiments of the disclosed subject matter, mechanisms, which can include methods, systems, and/or media, for presenting interactive audio content are provided.

In accordance with some embodiments of the disclosed subject matter, a method for presenting interactive audio content is provided, the method comprising: receiving narrative content that includes a plurality of action points, wherein each of the plurality of action points provides a plurality of user actions and a narrative portion corresponding to each of the plurality of user actions; determining a user engagement density associated with the received narrative content, wherein the user engagement density modifies the number of the plurality of action points to provide within the narrative content; causing the narrative content to be presented to a user based on the user engagement density; determining that a speech input has been received at one of the plurality of action points in the narrative content; converting the speech input to a text input; determining whether the user action associated with the text input corresponds to one of the plurality of user actions; selecting the narrative portion corresponding to the text input in response to determining that the user action corresponds to one of the plurality of user actions; converting the selected narrative portion to an audio output; and causing the narrative content with the converted audio output of the selected narrative portion to be presented to the user.

In some embodiments, receiving the narrative content further comprises transmitting a user selection of an interactive audiobook from a plurality of interactive audiobooks and receiving the selected interactive audiobook.

In some embodiments, converting the speech input to the text input further comprises: transmitting the speech input to a speech recognition system; and receiving the text input from the speech recognition system that corresponds to the speech input.

In some embodiments, converting the speech input to the text input comprises filtering out background sounds that are provided as a portion of the speech input.

In some embodiments, the method further comprises receiving a selection of the user engagement density from the user, wherein a higher-selected user engagement density increases the number of action points in the narrative content and wherein a lower-selected user engagement density decreases the number of action points in the narrative content.

In some embodiments, determining the user engagement density is based on an amount of user interaction with the narrative content.

In some embodiments, determining the user engagement density is based on the speech input received at each of the plurality of action points.

In some embodiments, the method further comprises generating a modified narrative portion from the narrative portion by transmitting the user action and the narrative portion into a grammar database.

In some embodiments, generating the modified narrative portion further comprises applying contextually-relevant terms from the grammar database into the narrative portion.

In some embodiments, converting the modified narrative portion to the audio output further comprises inserting at least one of: an emotional expression, an ambient sound, and a sound effect.

In accordance with some embodiments of the disclosed subject matter, a system for presenting interactive audio content is provided, the system comprising control circuitry that is configured to: receive narrative content that includes a plurality of action points, wherein each of the plurality of action points provides a plurality of user actions and a narrative portion corresponding to each of the plurality of user actions; determine a user engagement density associated with the received narrative content, wherein the user engagement density modifies the number of the plurality of action points to provide within the narrative content; cause the narrative content to be presented through an audio output connected to the control circuitry based on the user engagement density; determine that a speech input has been received at one of the plurality of action points in the narrative content using an audio input connected to the control circuitry; convert the speech input to a text input; determine whether the user action associated with the text input corresponds to one of the plurality of user actions; select the narrative portion corresponding to the text input in response to determining that the user action corresponds to one of the plurality of user actions; convert the selected narrative portion to an audio output portion; and cause the narrative content with the converted audio output of the selected narrative portion to be presented to the user through the audio output.

In accordance with some embodiments, a non-transitory computer-readable medium containing computer-executable instructions that, when executed by a processor, cause the processor to perform a method for presenting interactive audio content is provided, the method comprising: receiving narrative content that includes a plurality of action points, wherein each of the plurality of action points provides a plurality of user actions and a narrative portion corresponding to each of the plurality of user actions; determining a user engagement density associated with the received narrative content, wherein the user engagement density modifies the number of the plurality of action points to provide within the narrative content; causing the narrative content to be presented to a user based on the user engagement density; determining that a speech input has been received at one of the plurality of action points in the narrative content; converting the speech input to a text input; determining whether the user action associated with the text input corresponds to one of the plurality of user actions; selecting the narrative portion corresponding to the text input in response to determining that the user action corresponds to one of the plurality of user actions; converting the selected narrative portion to an audio output; and causing the narrative content with the converted audio output of the selected narrative portion to be presented to the user.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 3 shows an illustrative example of different features that can be associated with interactive narrative content based on user engagement density in accordance with some embodiments of the disclosed subject matter.

FIG. 5 shows an illustrative example of system commands that can be associated with the interactive narrative content in accordance with some embodiments of the disclosed subject matter.

FIG. 9 shows an illustrative example of a narration audio output and its various layers in accordance with some embodiments of the disclosed subject matter.

DETAILED DESCRIPTION

In accordance with some embodiments of the disclosed subject matter, mechanisms for presenting interactive audio content are provided.

Generally speaking, the mechanisms relate to presenting interactive audio content that can include any suitable editorial content, factual content, and/or fictional content based on user engagement density. More particularly, these mechanisms can include non-linear narrative content having multiple branches and/or action points that can be presented based on user engagement density and interacted with using speech recognition techniques and speech synthesis techniques.

These mechanisms can be used in a variety of applications. For example, these mechanisms can be used to allow a user that is listening to the non-linear narrative content to be the central character that drives the progression of the narrative content and personally experience places, other characters, and/or situations. In a more particular example, these mechanisms allow the user that is listening to the non-linear narrative content to control the amount of interaction with the narrative content—e.g., no interaction such that the narrative content is played back as an audiobook to substantial interaction such that the narrative content provides multiple action points that allow the user to interact with the narrative content. In another suitable example, these mechanisms can provide non-linear narrative content that is non-intrusive and effortless, yet highly engaging and interactive in which the user uses voice commands to control and influence the environment, flow, and/or outcome of a narrative.

Figure 1:
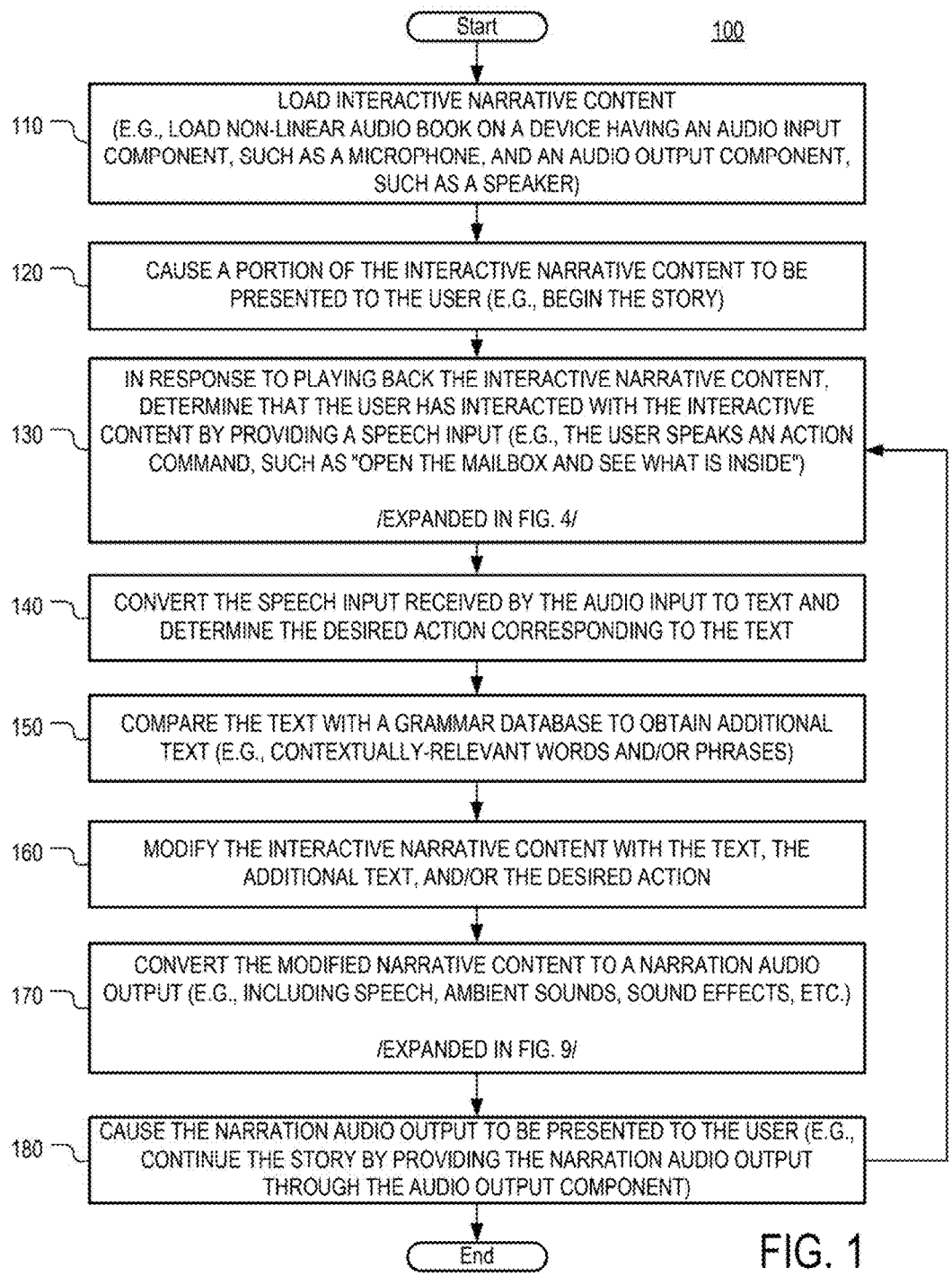
FIG. 1 shows an illustrative example of a process for presenting interactive audio content in accordance with some embodiments of the disclosed subject matter.

Turning to FIG. 1, an example 100 of a process for presenting interactive audio content in accordance with some embodiments of the disclosed subject matter is shown. At 110, process 100 can begin by receiving interactive narrative content. For example, a user using a mobile device can load an interactive audiobook containing the interactive narrative content. In a more particular example, the user using the mobile device can select an interactive audiobook containing the interactive narrative content and download the selected interactive audiobook to the mobile device. In another more particular example, the user can connect with an interactive audiobook online service via the mobile device (e.g., a cell phone or a computing device) and can download an audiobook that is interactive-narrative-content-enabled, where the non-interactive audiobook itself is available upon purchasing the audiobook and the interactive narrative content can be unlocked or otherwise enabled (e.g., by making a subsequent purchase on a payment portion of the interactive audiobook online service or any other suitable website). In yet another more particular example, a portion of the interactive narrative content can be made available upon purchasing the audiobook (e.g., the first chapter is interactive-narrative-content-enabled without the need for an additional payment), while other portions of the interactive narrative content can be unlocked or otherwise enabled by making a subsequent purchase. Upon enabling the interactive narrative content, the interactive narrative content and its action points, narrative branches, and/or other options, can be provided to the user of the interactive-audiobook-enabled device.

It should be noted that any suitable interactive narrative content can be used. For example, an interactive audiobook (sometimes referred to herein as an "IAB") can be generated by an author and/or software developer by developing IAB experiences using IAB Software Development Kits (SDKs), libraries, and application program interfaces (APIs) for use with a computing device (e.g., a cell phone, a tablet computing device, a laptop computer, a gaming console, etc.), where the interactive audiobook includes various action points that allow the listener to provide a speech input to guide the narrative content (e.g., examine an object, question a character, observe surroundings, etc.). In this example, the author may generate alternative versions of the narrative content that leads to one or more possible endings, thereby allowing the user to interact with the same narrative content and achieve different checkpoints and different endings (e.g., using a software development kit). That is, the author can include story logic, rules, and/or progression into the narrative content. In another example, an interactive audiobook can be generated by any suitable entity for use with a mobile device, where an audiobook is selected by one or more users and the author of the audiobook has placed bookmarks for possible interaction with the narrative content. In response, alternative content can be inserted at one or more bookmarks to provide non-linear narrative content and allow the user to guide the narrative content.

Moreover, narrative content can include any suitable content, such as editorial content, factual content, fictional content, etc., where user input can influence the narration logic and event processing which, in turn, determines the story branching and progression. In addition to the interactive fictional content example used herein, story branching and progression can also apply to editorial content, where a user requests certain pieces of information or sections in a piece of information, such as a news article.

It should also be noted that, although the embodiments described herein generally refer to action points as portions of the narrative content that can be interacted with by the user, this is merely illustrative. In some embodiments, an action point can be a user-triggered event. For example, in response to detecting a speech input or any other suitable interaction with the narrative content, an action point can be triggered and the mechanisms can determine whether there are one or more corresponding actions, such as interacting with an object or questioning a character. In some embodiments, an action point can be a problem or puzzle for the user to solve, where one or more corresponding actions must be completed by the user prior to the narrative content progressing. For example, the user may have to search through an area to find a hidden lever to open a trapdoor prior to the story continuing.

It should further be noted that, although the embodiments described herein generally refer to a mobile device, these mechanisms can be implemented with any suitable device. For example, these mechanisms can be implemented with any suitable device that includes an audio input device (e.g., a microphone) and an audio output device (e.g., a speaker). These devices can include, for example, a computing device, a tablet computing device, a mobile telephone, a gaming device, a television, a set-top box, etc. In another example, these mechanisms can be implemented on multiple devices, such as a television that includes an audio output device (e.g., a speaker) and a mobile telephone that includes an audio input device (e.g., a microphone). In such an example, the speech input captured by the audio input device on the mobile telephone can be processed by the mobile telephone (e.g., using speech recognition features on the mobile telephone) and, upon obtaining the audio output to continue the narrative content, transmitting the audio output to the television for outputting through the audio output device (e.g., a speaker) and outputting through the audio output device on the mobile telephone.

In some embodiments, the interactive narrative content can be modified based on user engagement density. This is sometimes referred to herein as "dynamic user engagement density" or "DUED."

Generally speaking, user engagement density can be used to modify the amount of interaction with the interactive narrative content. For example, using a user engagement density setting (e.g., Null, Medium, or Maximum), the user engagement density setting can allow the user to select how much depth, detail, and interaction the user wishes to be exposed to during a session with the interactive narrative content. This can allow the user to, for example, customize the interactive narrative content to multiple and/or varied user situations and preferences. In the user scenario of driving a car, the mechanism executing on a mobile device can present the interactive narrative content with a reduced amount of interaction or no interaction with the interactive narrative content (e.g., as the user may require concentration for driving the car). Alternatively, there are user scenarios where the user can provide substantial attention and/or focus to the interactive narrative content. As such, the amount of interaction can be increased—e.g., additional action points, additional items to interact with, additional puzzles, additional characters in the narrative content, additional sound effects, etc.

Figure 2:
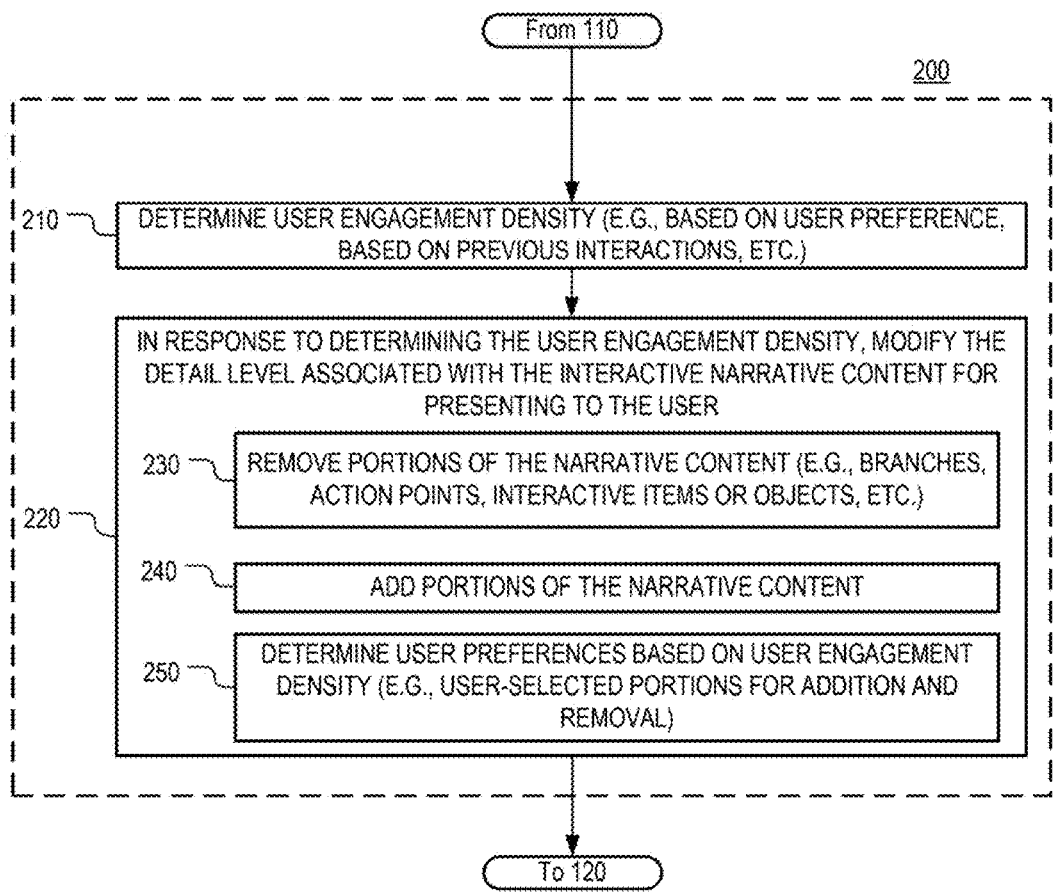
FIG. 2 shows an illustrative example of a process for modifying the detail level associated with the interactive narrative content based on user engagement density in accordance with some embodiments of the disclosed subject matter.

Turning to FIG. 2, process 200 can begin by determining the user engagement density at 210. In some embodiments, the user engagement density can be determined by a user setting. For example, it can be determined that the user has set a user engagement density of null for no interaction or minimal interaction, medium for some amount of interaction, and maximum for a substantial amount of interaction with the narrative content. Additionally or alternatively, the user engagement density can be determined based on previous user interactions with the narrative content. For example, in response to determining that the user did not provide a speech input or any other suitable input at multiple action points, the user engagement density can be decreased to an appropriate level—e.g., from maximum to medium. Additionally or alternatively, the user engagement density can be determined based on user activity. For example, the user can be prompted to select an activity that the user is currently engaged in (e.g., flying on an airplane, driving a car, sitting at home, etc.) and, in response to the selected activity, the user engagement density can be set to an appropriate level—e.g., null for a user that is driving a car, but maximum for a user that is sitting at home. Any suitable approach can be used for setting and/or adjusting the user engagement density.

Referring back to FIG. 2, in response to determining the user engagement density, the detail level associated with the interactive narrative content can be modified at 220. As shown at 230, this can include removing portions of the interactive narrative content, such as story branches, action points, interactive items or objects, characters, etc., when the detail level is decreased in response to a decreased user engagement density. For example, in response to determining that the user engagement density is null, all user input can be turned off and/or ignored. That is, when an action point or conditional user-triggered event is reached, the narrative content automatically progresses without any interaction from the user. In another example, in response to determining that the user engagement density is medium or at an intermediate level, particular action points or other portions of the interactive narrative content can be deactivated. An illustrative example of different features associated with the interactive narrative content is shown in FIG. 3.

Similarly, as shown at 240, this can include adding portions of the interactive narrative content when the detail level is increased in response to an increased user engagement density. For example, in response to determining that the user engagement density is at a high level (e.g., maximum), the user may be required to interact at an action point in order for the narrative content to progress. In a more particular example, the interactive narrative content may require the user to interact with the story, locations, and/or characters, find clues or solve situations in order for the narrative to progress, etc. As shown in FIG. 3, each of the features associated with the interactive narrative content can be activated in response to determining a high level of user engagement density.

Additionally or alternatively, at 250, user preferences can be determined based on the user engagement density. For example, the user can select which action points or categories of action points (e.g., interaction with items and objects) to deactivate. Referring back to FIG. 3, for particular user engagement density settings, the user can activate and/or deactivate particular features of the interactive narrative content.

In a more particular example, when the user engagement density is set to a minimal level, such as null, the interactive narrative content can unconditionally drive the events towards the inevitable checkpoint or chapter ending. For example, when the story involves a classic mystery as the character arriving at an abandoned mansion and investigating the many rooms, the interactive narrative content can unconditionally drive the events towards the inevitable checkpoint or chapter ending, where the character finds a hidden lever that opens up a trapdoor to a secret laboratory at the mansion and is at that moment beaten unconscious. Alternatively, when the user engagement density is set of a high level, such as maximum, the interactive narrative content can require that the user interact (e.g., through speech inputs) with the interactive narrative content to find a hidden lever to the particular trapdoor and drive the narrative content after a thorough search of the location. In addition, the user can then be required to examine clues and hints after performing an action such as turning on the light after having replaced a broken fuse in the basement of the mansion. In this example of the interactive narrative content, only then is the user capable of finding the hidden lever that is disguised to look like a book, placed in a bookshelf in the library.

Referring back to FIG. 1, at 120, a portion of the interactive narrative content can be presented to the user. For example, the interactive narrative content can be presented as audio content through a speaker or any other suitable audio output device on a mobile device. As described above, the amount of interaction associated with the narrative content can be based on the user engagement density or any other suitable user preference.

It should be noted that, although the audio content of the interactive narrative content can be provided through a speaker or any other suitable audio output device on a mobile device that includes a display screen, such a display screen or features of the display screen are not used to display any information related to the interactive narrative content. For example, maps, photographs or images of a location or events are not provided on the display screen of the mobile device. Rather, the interactive narrative content engages the user to interact with the content and navigate through the content with audio inputs and outputs and without any visual assistance. Similarly, the user can interact with the interactive narrative content through speech and voice commands and without depending on a physical controller (e.g., a mouse, a keyboard, etc.).

In response to playing back the interactive narrative content (e.g., through a speaker), it can be determined that the user has interacted with the interactive narrative content by providing a speech input. For example, a microphone or any other suitable audio input device connected to the mobile device can capture the speech input provided by the user. In this example, the microphone can be turned on when an action point in the interactive narrative content has been reached. Alternatively, in another example, the microphone can continuously detect speech inputs provided by the user. In response to detecting a speech input from the user, it can be determined whether an action point or a portion of the interactive narrative content has been reached.

Figure 4:
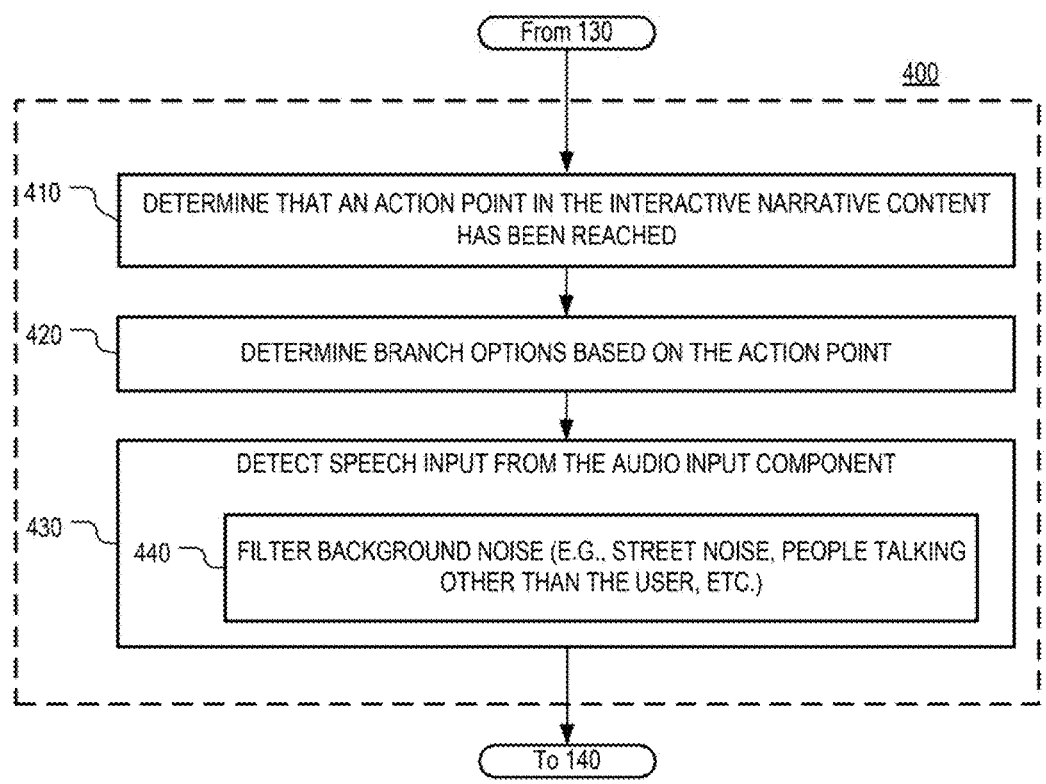
FIG. 4 shows an illustrative example of a process for determining branch options and detecting speech input in response to determining that an action point has been reached density in accordance with some embodiments of the disclosed subject matter.

More particularly, turning to FIG. 4, it can be determined whether an action point in the interactive narrative content has been reached at 410. In response to determining that an action point has been reached, the branch options or alternative content can be determined that are based on the action point at 420. That is, for a particular action point, the interactive narrative content can provide the user with various options, such as interacting the one or more items or objects, interacting with characters, examining a location, etc. At 430, upon determining that an action point in the interactive narrative content has been reached and determining the branch options for the user, a speech input from the audio input component (e.g., a microphone connected to the mobile device) can be detected. For example, the audio input component can be activated for receiving the speech input.

In some embodiments, at 440, background noises and other non-speech audio inputs can be filtered from the speech input. For example, the control circuitry can analyze the speech input to decrease the number of background audio events that are incorrectly identified as a speech input. In another example, in response to receiving a user activity that the user is engaged in while being presented with the interactive narrative content (e.g., driving a car, exercising, sitting in a home, etc.), anticipated background audio events, such as a doorbell ring, can be filtered from the speech input. In such an example, some speech inputs can be designated as a detected speech input, while other inputs can be ignored.

In some embodiments, the control circuitry can, upon suitable training, recognize and detect the voice of the user of the mobile device. For example, one or more models can be trained to recognize and/or detect the voice of the user by determining whether an instance of the user's voice was labeled correctly (e.g., a speech input from the user was designated as being provided by the user, a speech input from another user in the background was designated as not being provided by the user, etc.). As such, the control circuitry can detect speech inputs from the user and exclude other sounds (e.g., noises, peripheral sounds, etc.).

In some embodiments, in addition to noise and/or peripheral sound exclusion, the control circuitry can detect particular speech patterns of the user. For example, upon detecting a particular speech pattern (e.g., by comparing the speech input to one or more speech models), the control circuitry can detect different reactions or moods, such as stress, hesitation, anger, fear, happiness, etc. In turn, the control circuitry can use these detected reactions or moods to drive and/or adapt the interactive narrative content. For example, if it is detected that the user is stressed when the user provides a speech input to pull the hidden lever while investigating the scene, the control circuitry can change the interactive narrative content and, more particularly, the narration audio output described herein to recite that "with trembling hands, you nervously pull the lever." In another example, if it is detected that the user is confident and calm through the speech input to pull the lever while investigating the scene, the control circuitry can change the narration audio output to recite that "you pull the lever with great determination." In yet another example, if there is a detection of fear in the user's voice, the control circuitry can change the tempo of the story or change the background music provided in the story. This is sometimes referred to herein as "user-adaptive narrative alteration."

In a more particular example, the user can describe a desired action by speaking into the audio input device. For example, upon the character in the interactive narrative content arriving at an abandoned mansion and, after investigating the surroundings, finding a lever hidden in the bookshelf, the speech input can be: "Pull the lever." It should be noted that any suitable speech input having any suitable level of detail can be provided. For example, the speech input can be "Use the lever." In another example, the speech input can be "Grab the lever and pull it" or "Grab the lever and use it."

In some embodiments, the speech input received from the user can include system commands. For example, as shown in FIG. 5, the user can be provided with a number of system commands associated with the interactive narrative content. More particularly, the control circuitry can perform corresponding actions in response to receiving a "start" command, a "pause" command, a "quit" command, a "resume" command, a "save" command, a "load" command, a "recap" command, or a "settings" command. In response to receiving a system command, the control circuitry can perform the corresponding action, such as the corresponding actions shown in FIG. 5. For example, in response to receiving the "recap" command, the control circuitry can obtain session-related information and generate an update on the current narrative and recent events for presentation to the user.

Referring back to FIG. 1, in response to receiving the speech input, the speech input can be recognized using a speech recognition technique and the recognized speech input can be converted to text at 140. For example, a speech-to-text processing technique that uses speech recognition can be used to identify speech from received audio. In a more particular example, a speech-to-text processing technique can be used that compares the speech input or portions of the speech input to models for detecting and/or identifying speech from the received audio. These models can include Mel-Frequency Cepstral Coefficient (MFCC) models, Hidden Markov Models (HMMs), etc. The identified speech can then be converted to a sequence of text or a text file. It should be noted that any suitable speech-to-text processing technique can be used.

In response to obtaining the sequence of text from the speech input (e.g., the text "examine the lever"), the control circuitry can determine whether a desired action corresponds to the text. For example, the control circuitry can determine whether the text "examine the lever" is an available action at the particular action point in the interactive narrative content. In another example, the control circuitry can accept particular inputs from the user (e.g., a system command, an input relating to opening a mailbox, an input relating to seeing what is inside the mailbox, an input relating to observing the character's surroundings). In this example, in response to providing an input that is not acceptable or not anticipated, the user can be presented with a default message prompting the user to provide another speech input. Alternatively, in response to understanding the speech input via the analyzed text string and determining that the speech input is acceptable, the interactive narrative content can be modified and/or updated to reflect the user's desired action. That is, the user's speech input influences the interactive narrative content, thereby determining the story branching and progression.

Continuing the illustrative example from above where the user provided the speech input to "pull the lever," the desired action is interpreted. Based on story branching and progress conditions, the interactive narrative content is updated accordingly. The messaging back to the user is compiled and sent back to the user through the audio output component (e.g., a speaker). Such a message can include, for example: the user is now pulling the lever. As this condition is met, an event is triggered where in this case the character is attacked from behind and is rendered unconscious.

In some embodiments, the text (e.g., "examine the lever") can be used as an input in a dictionary, thesaurus, and/or grammar database at 150. This can provide contextually-relevant words and/or phrases for use in the interactive narrative content. Such a database can also provide variation to the interactive narrative content. For example, by applying modifications and/or alterations to the interactive narrative content to the grammatical construct without breaking the narrative logic or flow at 160, each story can become unique to the user. In a more particular example, in response to determining that the speech input requests that the character "examine the lever," the following interactive narrative content can be provided:

> The back of the lever looks just like any ordinary book in this massive library but when you gently pull the book cover out, you see the mechanical parts where the pages should be, revealing its true purpose. Without warning, you fall to your knees and you fade into a numb and flashing darkness from a blow on the back of your head that blurs everything out.

Figure 6:
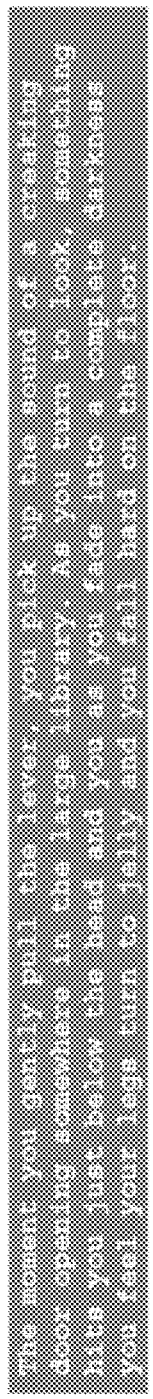
FIG. 6 shows an illustrative example of text that can be used as an input in a dictionary, thesaurus, and/or grammar database to provide variation to the interactive narrative content in accordance with some embodiments of the disclosed subject matter.

This illustrative example is also shown in FIG. 6.

Figure 7:
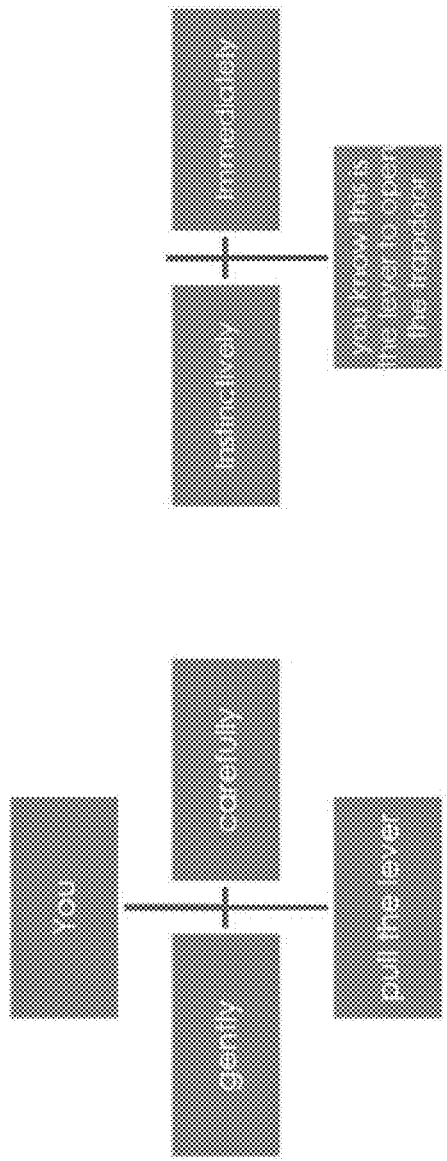
FIG. 7 shows an illustrative example of individual words and/or full sentences that can be filtered by a contextual thesaurus filter within the framework of the interactive narrative content and in context with the narrative situation in accordance with some embodiments of the disclosed subject matter.

It should be noted that these mechanisms apply contextual thesaurus filtering on interactive and non-linear narrative content, where the creation of alternative sentences, words, or other alternative content does not break the artistic language of the interactive narrative content. In order to not break immersion or context during a session, this framework can, in some embodiments, be manually generated. In the example shown in FIG. 7, the words "gently" and "carefully" would only belong together in a scene or story where the two words contextually fit well. For example, replacing the word "gently" or the word "carefully" with the phrase "with great care" is generally not appropriate as this may suggest that the object that the user is picking up is fragile or even broken. As also shown in FIG. 7, individual words and/or full sentences can be filtered by the contextual thesaurus filter (sometimes referred to herein as "contextual thesaurus narrative processing" or "CTNP") within the framework of the interactive narrative content and in context with the narrative situation. It should be noted that, in some examples, words may not have to be synonymous to reflect the same narrative effect of an action. For example, as shown in FIG. 7, the user can be presented with the message "instinctively, you know this is the lever to open up the trapdoor to the laboratory" or "immediately, you know this is the lever to open up the trapdoor to the laboratory."

In some embodiments, the use of a dictionary, thesaurus, and/or grammar database to generate contextually-relevant words and/or phrases for use in the interactive narrative content can be omitted.

Figure 8:
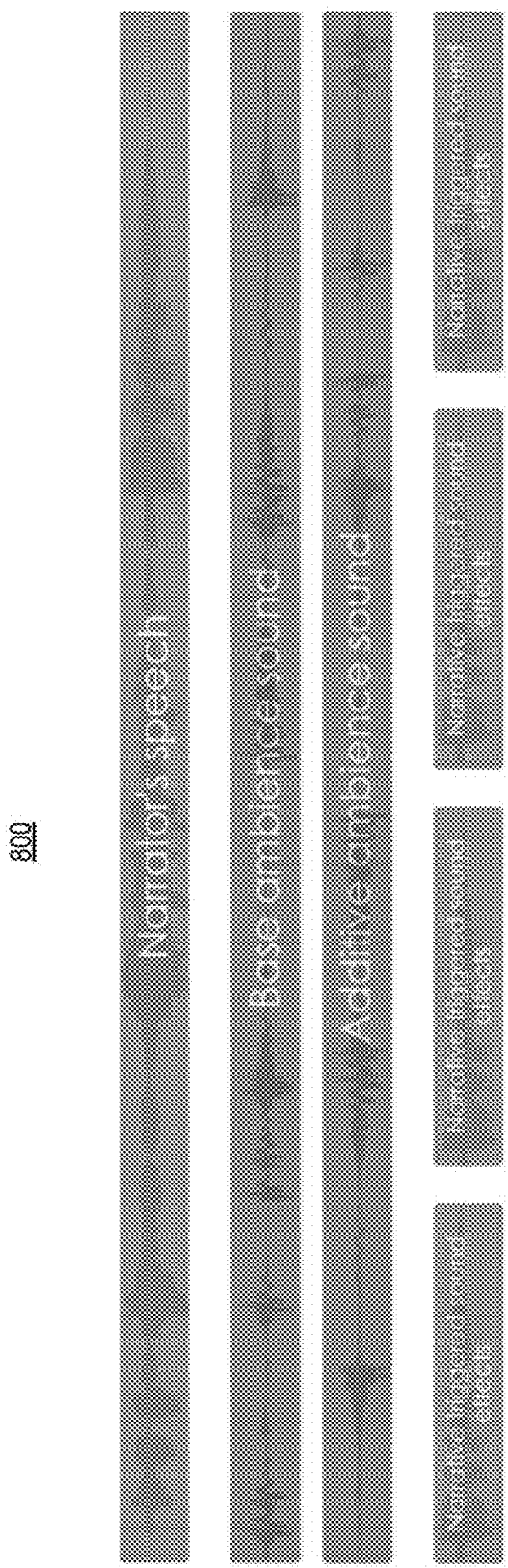
FIG. 8 shows an illustrative example of multiple layers of individual audio snippets that can be played back simultaneously or in a specific order in accordance with some embodiments of the disclosed subject matter.

Referring back to FIG. 1, the modified narrative content can then be converted to a narration audio output at 170. This can be done, for example, using a text-to-speech processing technique that takes the modified narrative content and generates the narration audio output in the form of spoken content. As described herein, the text-to-speech processing technique can include any suitable voice emulation or synthesis, any suitable number of voices, any suitable contextual inputs (e.g., keywords or words to emphasize), etc. The narration audio output can be provided in any suitable data format, such as a .WAV file, a .MP3 file, a .WMA file, a .OGG file In some embodiments, the narration audio output can also include speech effects, sound effects, ambient sounds, etc. to convey mood and reflect the user's desired action. As shown in FIG. 8, the narration audio output can consist of multiple layers of individual audio snippets that are played simultaneously or in a specific order. As also shown in FIG. 8, the narration audio output can include: a narrator's speech layer, a base ambience layer, an additive ambience layer, and a narrative triggered sound effects layer.

It should be noted, that although the embodiments described herein generally relate to multiple layers of audio snippets that are combined to form the narration audio output, this is merely illustrative. In some embodiments, a single layer or a single audio snippet can be used to convey the mood and/or reflect the user's desired action. For example, in response to understanding a user's desired action and determining the context of the narrative content, a particular sound effect or ambient sound can be played back through the audio output component to confirm the user's action (e.g., the sound of a squeaky mailbox door to indicate that the character has opened the mailbox).

In some embodiments, layers or portions of the narration audio output can be dynamically modified in various ways depending on situations, locations, events, and user actions through a session with the interactive narrative content. For example, with regard to the narrator's speech, the narration audio output can include a simulation of human speech. More particularly, the simulation of human speech can include actual respiration, phonation, and articulation that form the narrator's speech that is output to the user. In another example, particular keywords in the interactive narrative content can be modified in pitch, velocity, and/or speed. This can, for example, emphasize important information conveyed to the user or provide a dramatic effect.

In some embodiments, the narration audio output can include base ambience sounds. For example, looping sound segments can be played subtly to render mood and the scene of a location or situation. It should be noted that this layer of the narration audio output is generally not influenced on user action, but strengthens and/or supports immersion for the user. In a more particular example, base ambience sounds can include bird songs in a forest or the faint sounds of seagulls and a foghorn by the sea.

In some embodiments, the narration audio output can include additive ambience sounds. For example, additive ambience sounds can be provided to strengthen the surrounding sounds of the user's immediate surroundings or intensified situation.

In some embodiments, the narration audio output can include narrative triggered sound effects. For example, narrative triggered sound effects can be provided as short sound effects that are triggered to convey action and confirm events through the interactive narrative content. These short bursts of sound can, in some embodiments, help to articulate a specific moment during the narration—e.g., the creaking sound of a closing door, an explosion, the slashing of a knife, or the firing of a gun.

An illustrative example of the narration audio output and its various layers is shown in FIG. 9. As shown, the narration audio output can include a narrative layer, a keyword layer, a base ambient sound layer, an additive ambient sound layer, and a narrative triggered effect layer. More particularly, FIG. 9 shows how the layers of the narration audio output are used to describe a narrative portion where the user has pulled the lever at the abandoned mansion.

In some embodiments, the narration audio output can include a head-related transfer function sound output that uses one or more head-related transfer functions (HRTFs). The one or more HRTFs can be responses that characterize how an ear receives a sound from a point in space. For example, a pair of HRTFs can be used to synthesize a binaural sound that seems to come from a particular point in space.

Referring back to FIG. 1, upon generating the narration audio output, such as the one shown in FIG. 9, the narration audio output can be presented to the user. For example, the story can continue by providing the narration audio output through the audio output component (e.g., a speaker) of the mobile device.

In some embodiments, the user can resume a session with an interactive audio book and the interactive narrative content after a pause command or a quit command. In response, a summary of the previous session can be generated and presented to the user.

Figure 10:
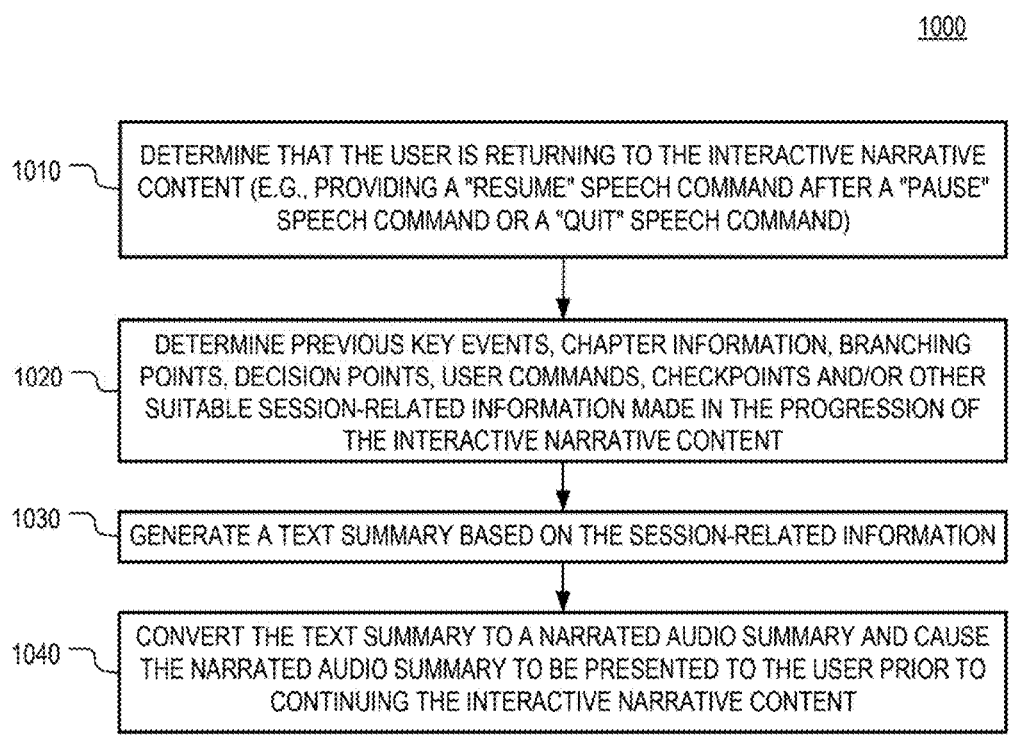
FIG. 10 shows an illustrative example of a process for generating a narrated audio summary that is presented to the user prior to continuing the interactive narrative content that a user has resumed in accordance with some embodiments of the disclosed subject matter.

Turning to FIG. 10, in response to detecting that a session is being resumed by a user at 1010, the control circuitry can determine previous key events, chapter information, branching points, decision points, action points, user commands, checkpoints, and/or other suitable session-related information made in the progression of the interactive narrative content at 1020. For example, the control circuitry can determine that, in the user's previous session, the user reached a checkpoint in the narrative by finding and pulling a lever and then being rendered unconscious with a blow to the back of the head. At 1030, a text summary based on the session-related information can be generated. For example, in connection with the exemplary session-related information above, the text summary can include:

> Previously on [IAB STORY]: Winston had finally arrived at the abandoned mansion. After many wrong turns on empty country roads due to heavy rain and fog, he eventually knew he found the old building. For hours he searched the house, knowing there was a way into the professor's secret laboratory. The moment he found the hidden lever to open the trapdoor, someone attacked him from behind. The professor? Welcome back to the story, [User].

In some embodiments, the text summary can be generated by inputting the session-related information, such as keywords, checkpoints, previous user actions, into the grammar database. In some embodiments, a template can be provided for a portion of the text summary and the remaining portion can be obtained from the grammar database.

At 1040, upon generating the text summary, the text summary can be converted to a narrated audio summary that is presented to the user prior to continuing the interactive narrative content at 1040. For example, as described above, the text summary can be converted to a narrated audio summary that includes music and/or other sound effects.

These and other features for providing interactive audio content are further described, for example, in the Appendix, entitled "IAB—Interactive Audio Book" (attached hereto), which is hereby incorporated by reference herein in its entirety.

Figure 11:
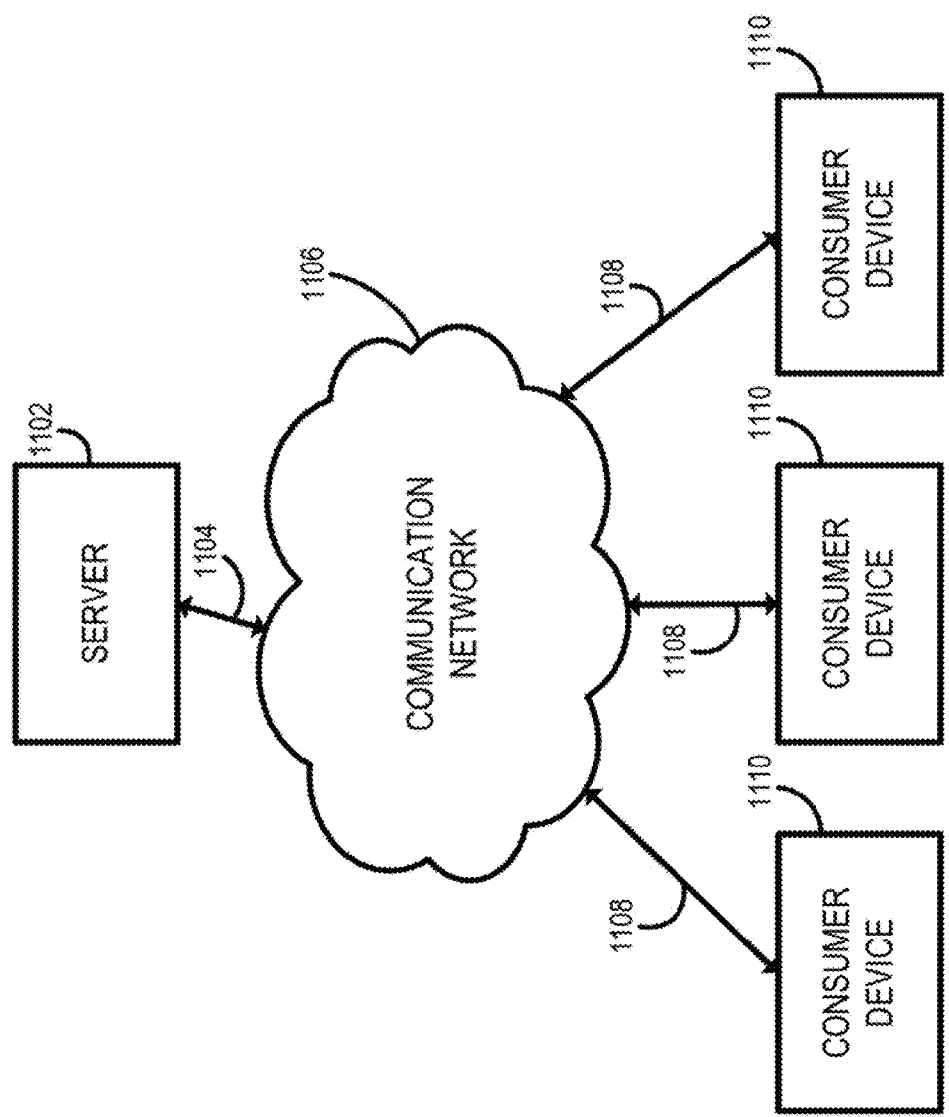
FIG. 11 shows an example of a generalized schematic diagram of a system on which the mechanisms for presenting interactive audio content described herein in accordance with some embodiments of the disclosed subject matter.

FIG. 11 shows an example of a generalized schematic diagram of a system 1100 on which the mechanisms for presenting interactive audio content described herein can be implemented as an application in accordance with some embodiments. As illustrated, system 1100 can include one or more consumer devices 1110. Consumer devices 1110 can be local to each other or remote from each other. Consumer devices 1110 can be connected by one or more communications links 1108 to a communications network 1106 that can be linked via a communications link 1104 to a server 1102.

System 1100 can include one or more servers 1102. Server 1102 can be any suitable server for utilizing the mechanisms described herein and/or executing process 100, such as a processor, a computer, a data processing device, or any suitable combination of such devices. For example, the mechanisms described herein can be distributed into multiple backend components and multiple frontend components or interfaces. In a more particular example, backend components, such as data collection and data distribution can be performed on one or more servers 1102. In another more particular example, interactive audio content can be stored on one or more servers 1102.

More particularly, for example, each of the consumer devices 1110 and server 1102 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, consumer device 1110 can be implemented as a personal computer, a smartphone, a tablet computer, a personal data assistant (PDA), a multimedia terminal, a mobile telephone, a set-top box, a television, a game console, etc.

In some embodiments, communications network 1106 can be any suitable computer network or combination of networks including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), etc. Communications links 1104 and 1108 can be any communications links suitable for communicating data between consumer devices 1110 and server 1102, such as network links, dial-up links, wireless links, hard-wired links, any other suitable communications links, or any suitable combination of such links. Consumer devices 1110 can enable a user to load a web page that causes features of mechanisms described herein to be accessed. Consumer devices 1110 and server 1102 can be located at any suitable location.

It should be noted that, although consumer device 1110 implementing the interactive audiobook mechanisms described herein can be connected to a network, such as the Internet, via communications network 1106, the mechanisms described herein can be performed off-line on consumer device 1110 that may or may not have a connection to communications network 1106.

Figure 12:
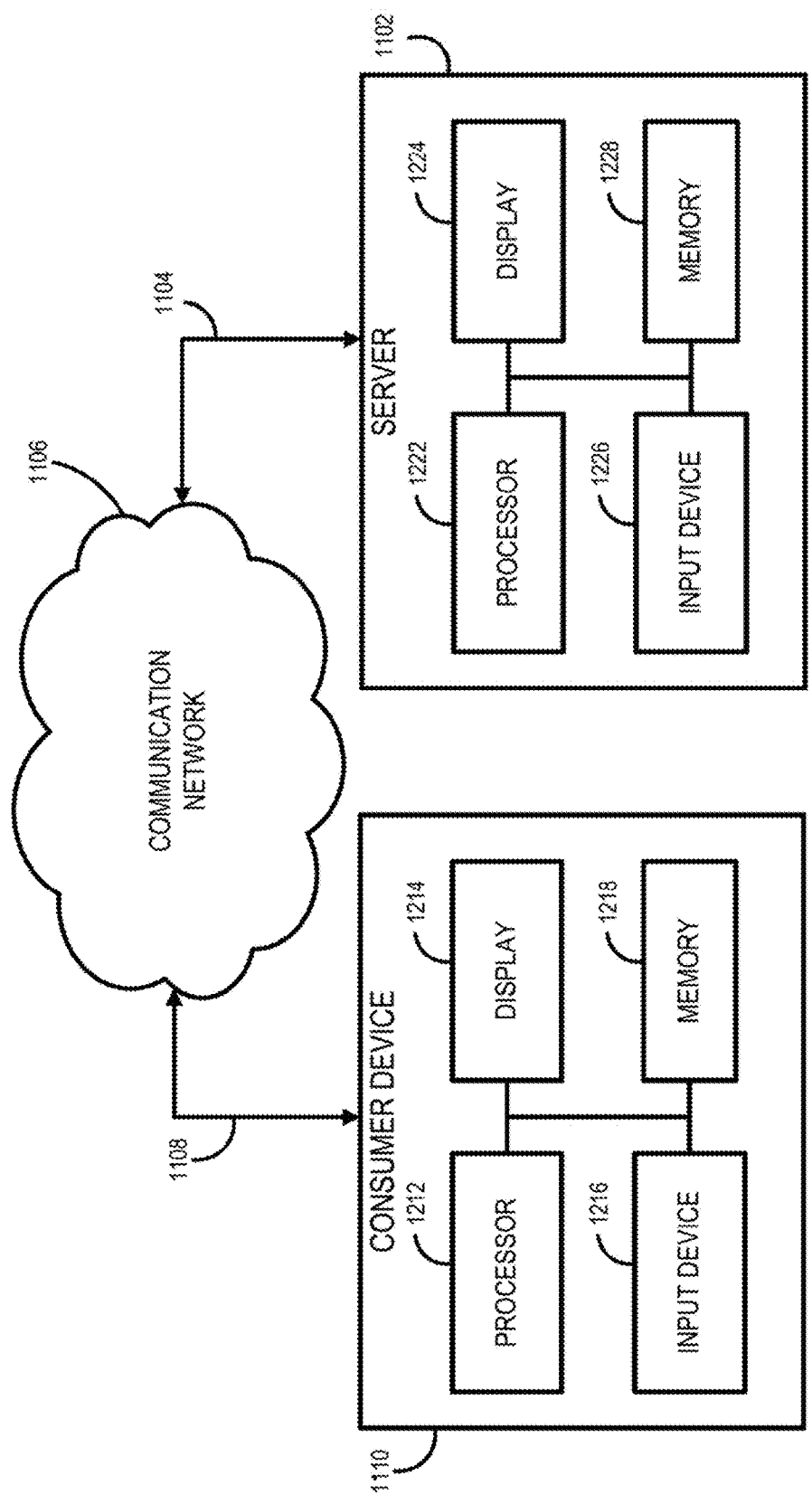
FIG. 12 shows an illustrative example of a server and a user device as provided, for example, in FIG. 11 in accordance with some embodiments of the disclosed subject matter.

FIG. 12 illustrates an example of hardware 1100 where the server and one of the consumer devices depicted in FIG. 11 are illustrated in more detail. Referring to FIG. 12, consumer device 1110 can include a processor 1212, a display 1214, an input device 1216, and memory 1218, which can be interconnected. In some embodiments, memory 1218 can include a storage device (such as a computer-readable medium) for storing a computer program for controlling processor 1212. It should also be noted that data received through communications link 1108 or any other communications links can be received from any suitable source. Display 1214 can be a flat panel display, a cathode ray tube display, a projector, a touch screen, a speaker(s), and/or any other suitable display and/or presentation devices. Input device 1216 can be a microphone, a voice recognition circuit, and/or any other suitable input device.

Server 1102 can include processor 1222, display 1224, input device 1226, and memory 1228, which can be interconnected. In some embodiments, memory 1228 can include a storage device for storing data received through communications link 1104 or through other links, and also receives commands and values transmitted by one or more users. The storage device can further include a server program for controlling processor 1222.

Hardware processor 1222 can use the server program to communicate with consumer devices 1110, as well as provide access to and/or copies of the mechanisms described herein. It should also be noted that data received through communications link 1104 or any other communications links can be received from any suitable source. In some embodiments, hardware processor 1222 can send and receive data through communications link 1104 or any other communication links using, for example, a transmitter, receiver, transmitter/receiver, transceiver, or any other suitable communication device. In some embodiments, hardware processor 1222 can receive commands and/or values transmitted by one or more users and/or consumer devices 1110. Display 1224 can be a flat panel display, a cathode ray tube display, a projector, a touch screen, a speaker(s), and/or any other suitable display and/or presentation devices. Input device 1226 can be a computer keyboard, a computer mouse, a microphone, a touchpad, a voice recognition circuit, a touchscreen, and/or any other suitable input device.

In some embodiments, server 1102 can be implemented in one server or can be distributed as any suitable number of servers. For example, multiple servers 1102 can be implemented in various locations to increase reliability and/or increase the speed at which the server can communicate with computing devices 1110.

In one particular embodiment, the mechanisms described herein can include server-side software, server-side hardware, client-side software, client-side hardware, or any suitable combination thereof. For example, the mechanisms described herein can encompass a computer program written in a programming language recognizable by server 1102 and/or by consumer device 1110 (e.g., a program written in a programming language, such as, Java, C, Objective-C, C++, C#, Javascript, Visual Basic, or any other suitable approaches). As another example, the mechanisms described herein can encompass one or more Web pages or Web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches).

Accordingly, methods, systems, and media for presenting interactive audio content are provided.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIGS. 1, 2, 4, and 10 can be executed or performed in any order or sequence not limited to the order and sequence shown and described in the figures. Also, some of the above steps of the processes of FIGS. 1, 2, 4, and 10 can be executed or performed substantially simultaneously where appropriate or in parallel to reduce latency and processing times.

It should also be noted that, as used herein, the term mechanism can encompass hardware, software, firmware, or any suitable combination thereof.

Although the invention has been described and illustrated in the foregoing illustrative implementations, it is understood that the present disclosure has been made only by way of example, and that numerous changes in the details of implementation of the invention can be made without departing from the spirit and scope of the invention. Features of the disclosed implementations can be combined and rearranged in various ways.

What is claimed is:

1. A method for presenting interactive audio content, the method comprising:
receiving, using a computing device that includes a hardware processor, an interactive audiobook having narrative content that includes a plurality of action points, wherein each of the plurality of action points provides a plurality of user actions and a narrative portion corresponding to each of the plurality of user actions;
causing a user engagement density setting to be presented, wherein a user selection of the user engagement density setting determines a number of the plurality of action points in the narrative content of the interactive audiobook, wherein a first user engagement density increases the number of the plurality of action points in the narrative content of the interactive audiobook, and wherein a second user engagement density decreases the number of the plurality of action points in the narrative content of the interactive audiobook;
receiving, using the hardware processor of the computing device, the user selection of a user engagement density from the user engagement density setting;
converting the narrative content with the determined number of the plurality of action points to an audio output based on the selected user engagement density; and
causing, using the hardware processor of the computing device, the audio output containing the narrative content with the determined number of the plurality of action points to be presented via an audio output device connected to the computing device.

2. The method of claim 1, wherein receiving the narrative content further comprises transmitting a user selection of the interactive audiobook from a plurality of interactive audiobooks and receiving the selected interactive audiobook.

3. The method of claim 1, further comprising:
determining that a speech input has been received by an audio input device connected to the computer device at one of the plurality of action points during the playback of the narrative content in the interactive audiobook;
converting the speech input to a text input;
determining whether the user action associated with the text input corresponds to one of the plurality of user actions;
selecting the narrative portion corresponding to the text input in response to determining that the user action corresponds to one of the plurality of user actions;
converting the selected narrative portion to generate a converted audio output;
modifying the narrative content of the interactive audiobook with the converted audio output of the selected narrative portion; and
causing the narrative content with the converted audio output of the selected narrative portion to be presented via the audio output device connected to the computing device.

4. The method of claim 2, wherein converting the speech input to the text input further comprises:
transmitting the speech input to a speech recognition system; and
receiving the text input from the speech recognition system that corresponds to the speech input.

5. The method of claim 3, wherein converting the speech input to the text input comprises filtering out background sounds that are provided as a portion of the speech input.

6. The method of claim 3, wherein the modified narrative content of the interactive audiobook is generated by transmitting the user action and the narrative portion into a grammar database and applying contextually-relevant terms from the grammar database into the narrative portion.

7. The method of claim 3, wherein converting the selected narrative portion to the audio output further comprises inserting at least one of: an emotional expression, an ambient sound, and a sound effect.

8. A method for presenting interactive audio content, the method comprising:
receiving, using a computing device that includes a hardware processor, an interactive audiobook having narrative content that includes a plurality of action points, wherein each of the plurality of action points provides a plurality of user actions and a narrative portion corresponding to each of the plurality of user actions;

determining, using the hardware processor of the computing device, a user engagement density from a plurality of user engagement densities, wherein the determined user engagement density corresponds to a number of the plurality of action points in the narrative content of the interactive audiobook, wherein a first user engagement density of the plurality of user engagement densities increases the number of the plurality of action points in the narrative content of the interactive audiobook and a second user engagement density of the plurality of user engagement densities decreases the number of the plurality of action points in the narrative content of the interactive audiobook;

converting, using the hardware processor of the computing device, the narrative content with the number of the plurality of action points to an audio output based on the determined user engagement density; and causing, using the hardware processor of the computing device, the audio output containing the narrative content with the determined number of the plurality of action points to be presented via an audio output device connected to the computing device.

9. The method of claim 8, wherein receiving the narrative content further comprises transmitting a user selection of the interactive audiobook from a plurality of interactive audiobooks and receiving the selected interactive audiobook.

10. The method of claim 8, further comprising:
determining that a speech input has been received by an audio input device connected to the computer device at one of the plurality of action points during the playback of the narrative content in the interactive audiobook;
converting the speech input to a text input;
determining whether the user action associated with the text input corresponds to one of the plurality of user actions;
selecting the narrative portion corresponding to the text input in response to determining that the user action corresponds to one of the plurality of user actions;
converting the selected narrative portion to generate a converted audio output;
modifying the narrative content of the interactive audiobook with the converted audio output of the selected narrative portion; and
causing the narrative content with the converted audio output of the selected narrative portion to be presented via the audio output device connected to the computing device.

11. The method of claim 8, wherein determining the user engagement density is based on an amount of user interaction with the narrative content of the interactive audiobook.

12. The method of claim 8, wherein determining the user engagement density is based on the speech input received at each of the plurality of action points.

13. A system for presenting interactive audio content, the system comprising:
a memory; and
a hardware processor that, when executing computer executable instructions stored in the memory, is configured to:
receive an interactive audiobook having narrative content that includes a plurality of action points, wherein each of the plurality of action points provides a plurality of user actions and a narrative portion corresponding to each of the plurality of user actions;
cause a user engagement density setting to be presented, wherein a user selection of the user engagement density setting determines a number of the plurality of action points in the narrative content of the interactive audiobook, wherein a first user engagement density increases the number of the plurality of action points in the narrative content of the interactive audiobook, and wherein a second user engagement density decreases the number of the plurality of action points in the narrative content of the interactive audiobook,
receive the user selection of a user engagement density from the user engagement density setting;
converting the narrative content with the determined number of the plurality of action points to an audio output based on the selected user engagement density; and
cause the audio output containing the narrative content with the determined number of the plurality of action points to be presented via an audio output device connected to the computing device.

14. The system of claim 13, wherein receiving the narrative content further comprises transmitting a user selection of the interactive audiobook from a plurality of interactive audiobooks and receiving the selected interactive audiobook.

15. The system of claim 13, wherein the hardware processor is further configured to:
determine that a speech input has been received by an audio input device connected to the computer device at one of the plurality of action points during the playback of the narrative content in the interactive audiobook;
convert the speech input to a text input;
determine whether the user action associated with the text input corresponds to one of the plurality of user actions;
select the narrative portion corresponding to the text input in response to determining that the user action corresponds to one of the plurality of user actions;
convert the selected narrative portion to generate a converted audio output;
modify the narrative content of the interactive audiobook with the converted audio output of the selected narrative portion; and
cause the narrative content with the converted audio output of the selected narrative portion to be presented via the audio output device connected to the computing device.

16. The system of claim 15, wherein converting the speech input to the text input further comprises:
transmitting the speech input to a speech recognition system; and
receiving the text input from the speech recognition system that corresponds to the speech input.

17. The system of claim 15, wherein converting the speech input to the text input comprises filtering out background sounds that are provided as a portion of the speech input.

18. The system of claim 15, wherein the modified narrative content of the interactive audiobook is generated by transmitting the user action and the narrative portion into a grammar database and applying contextually-relevant terms from the grammar database into the narrative portion.

19. The system of claim 15, wherein converting the selected narrative portion to the audio output further comprises inserting at least one of: an emotional expression, an ambient sound, and a sound effect.

* * * * *